United States Patent
Sim

(10) Patent No.: US 9,525,681 B2
(45) Date of Patent: Dec. 20, 2016

(54) TERMINAL AUTHENTICATION SYSTEM AND METHOD FOR VEHICLE NETWORK CONNECTION

(71) Applicant: Hyundai Motor Company, Seoul (KR)

(72) Inventor: Hyun Chul Sim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/526,175

(22) Filed: Oct. 28, 2014

(65) Prior Publication Data

US 2015/0229637 A1  Aug. 13, 2015

(30) Foreign Application Priority Data

Feb. 7, 2014  (KR) .................. 10-2014-0014275

(51) Int. Cl.
  *H04L 29/06*  (2006.01)
  *H04W 12/06*  (2009.01)
  *H04L 29/08*  (2006.01)

(52) U.S. Cl.
  CPC .......... *H04L 63/0823* (2013.01); *H04W 12/06* (2013.01); *H04L 29/06* (2013.01); *H04L 67/12* (2013.01)

(58) Field of Classification Search
  USPC ........................................................ 726/10
  See application file for complete search history.

(56) References Cited

U.S. PATENT DOCUMENTS

| | | | | |
|---|---|---|---|---|
| 2003/0147534 A1* | 8/2003 | Ablay | ................. | H04L 9/3271 380/270 |
| 2010/0037057 A1* | 2/2010 | Shim | ................. | H04L 63/0823 713/171 |
| 2011/0196946 A1 | 8/2011 | Manchester et al. | | |
| 2012/0039248 A1* | 2/2012 | Schneider | ........... | H04W 84/005 370/328 |
| 2013/0078951 A1* | 3/2013 | Mun | ..................... | G06F 21/305 455/411 |
| 2013/0231052 A1* | 9/2013 | Eling | ................. | H04L 63/0876 455/41.2 |

FOREIGN PATENT DOCUMENTS

| | | |
|---|---|---|
| JP | 2010-524405 A | 7/2010 |
| JP | 2012-500516 A | 1/2012 |
| KR | 10-1043518 B1 | 6/2011 |
| KR | 10-2012-0094700 | 8/2012 |
| KR | 10-2012-0095650 | 8/2012 |
| KR | 10-2013-0051636 A | 5/2013 |
| WO | 2013/000645 A1 | 1/2013 |

* cited by examiner

*Primary Examiner* — Jeffrey Pwu
*Assistant Examiner* — Samuel Ambaye
(74) *Attorney, Agent, or Firm* — Mintz Levin Cohn Ferris Glovsky and Popeo, P.C.; Peter F. Corless

(57) ABSTRACT

A terminal authentication method for vehicle network connection is disclosed. The terminal authentication method includes acquiring unique identification information of a terminal, generating a certificate of network authentication using the unique identification information, copying the generated certificate of network authentication in the terminal, and performing authentication of the terminal access to a network using a network authentication application in the terminal and the copied certificate of network authentication.

11 Claims, 4 Drawing Sheets

TERMINAL AUTHENTICATION SYSTEM AND METHOD FOR VEHICLE NETWORK CONNECTION

CROSS-REFERENCE TO RELATED APPLICATION

This application claims the benefit of Korean Patent Application No. 10-2014-0014275, filed on Feb. 7, 2014, which is hereby incorporated by reference as if fully set forth herein.

BACKGROUND

Technical Field

The present disclosure relates to a terminal authentication system and method for vehicle network connection.

Discussion of the Related Art

An audio/video navigation (AVN) system used in a vehicle provides a variety of services, such as the Internet, games, music, pictures, videos, and digital multimedia broadcasting (DMB), in addition to traffic guidance. Furthermore, the AVN system provides a wireless gateway function to enable a mobile terminal, such as a smartphone or a tablet PC, including a communication device to access a network.

However, if the network is easily accessible through the AVN system, or by using a simple password, unauthorized users may obtain access to the network and a security problem may occur. For this reason, there is a need for a method that enables only a specific mobile terminal to access a network using a vehicle communication device.

SUMMARY

Accordingly, the present disclosure is directed to a terminal authentication system and method for vehicle network connection that substantially obviates one or more problems due to limitations and disadvantages of the related art.

An object of the present disclosure is to provide a terminal authentication system and method for vehicle network connection that enable a mobile terminal to use a network through a wired/wireless network authentication procedure.

Additional advantages, objects, and features of the present disclosure will be set forth in part in the description which follows, and in part will become apparent to those having ordinary skill in the art upon examination of the following or may be learned from practice of the disclosed embodiments. The objectives and other advantages of the present disclosure may be realized and attained by the structure particularly pointed out in the written description and claims hereof, as well as the appended drawings.

To achieve these objects and other advantages and in accordance with the purpose of the present disclosure, as embodied and broadly described herein, a terminal authentication method for vehicle network connection includes acquiring unique identification information of a terminal, generating a certificate of network authentication using the unique identification information, copying the generated certificate of network authentication in the terminal, and performing authentication of the terminal access to a network using a network authentication application in the terminal and the copied certificate of network authentication.

The step of acquiring the unique identification information may include checking a media access control (MAC) address of the terminal using Android Debug Bridge and acquiring the unique identification information according to the MAC address.

The certificate of network authentication may be copied in the terminal using a push command of Android Debug Bridge.

The network authentication application may be controlled to be automatically installed in the terminal and executed by Android Debug Bridge.

The terminal authentication method may further include outputting an authentication completion message when the network authentication application completes authentication of the terminal access to the network using the copied certificate of network authentication.

In another aspect of the present disclosure, a terminal authentication system for vehicle network connection comprises a vehicle communication device including a communication unit to acquire unique identification information of a terminal, an authentication controller to generate a certificate of network authentication using the unique identification information, to copy the generated certificate of network authentication in the terminal, and to control a network authentication application to be installed and executed in the terminal, and a terminal to perform authentication of the terminal access to a network using the copied certificate of network authentication and the network authentication application.

The unique identification information may be acquired based on a MAC address of the terminal.

The certificate of network authentication may be copied in the terminal using a push command of Android Debug Bridge.

The network authentication application may be controlled to be automatically installed in the terminal and executed by Android Debug Bridge.

The terminal authentication system may further include an output unit to output an authentication completion message when the network authentication application completes authentication of the terminal access to the network using the copied certificate of network authentication.

It is to be understood that both the foregoing general description and the following detailed description of the disclosed embodiments are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate the disclosed embodiment(s) and together with the description serve to explain the principle of the disclosure. In the drawings.

DETAILED DESCRIPTION OF THE EMBODIMENTS

Figure 1:
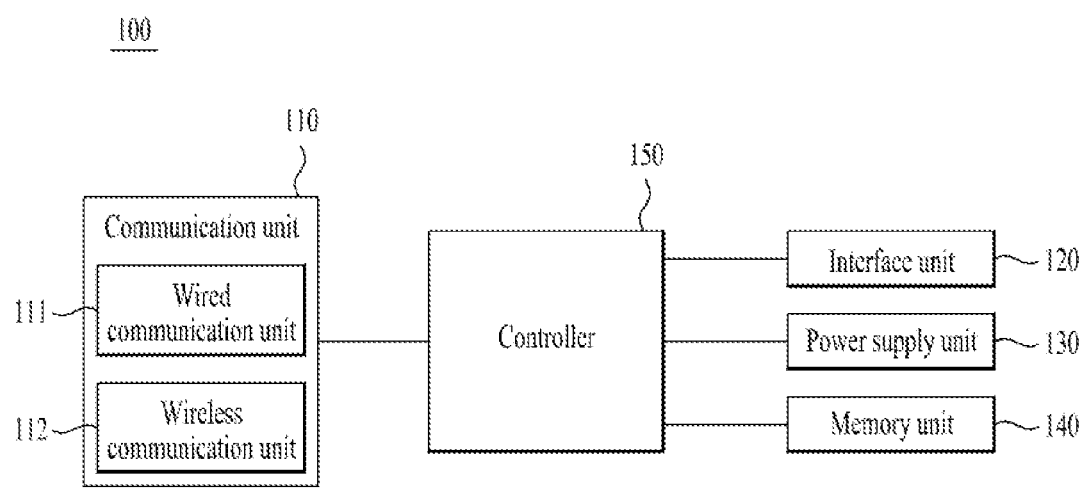
FIG. 1 is a block diagram of a vehicle communication device according to an embodiment of the present disclosure.

Reference will now be made in detail to the preferred embodiments of the present disclosure, examples of which are illustrated in the accompanying drawings. First of all, terminology used in this specification and claims must not be construed as limited to the general or dictionary meanings thereof and should be interpreted as having meanings and concepts matching the technical idea of the present disclosure based on the principle that an inventor is able to appropriately define the concepts of the terminologies to describe the invention in the best way possible. The embodiment disclosed herein and configurations shown in the accompanying drawings are only one preferred embodiment and do not represent the full technical scope of the present disclosure. Therefore, it is to be understood that the present disclosure covers the modifications and variations of the embodiments provided they come within the scope of the appended claims and their equivalents when this application was filed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a block diagram of a vehicle communication device 100 according to an embodiment of the present disclosure.

The vehicle communication device 100 enables a terminal adjacent to a vehicle to access a network, such as the Internet. The vehicle communication device 100 is a module included in the vehicle. For example, the vehicle communication device 100 may be included in an audio/video navigation (AVN) system of the vehicle. The vehicle communication device 100 may be connected to a component of the vehicle or a component of the AVN system in the vehicle. Meanwhile, the terminal connected to the vehicle communication device 100 may include a smartphone, a tablet PC, a laptop computer, a digital TV, a desktop computer, and/or the like.

The vehicle communication device 100 may include a communication unit 110, an interface unit 120, a power supply unit 130, and a memory unit 140. The components shown in FIG. 1 are not requisite and are shown merely for demonstration purposes. The vehicle communication device 100 may include more or less components.

The communication unit 110 is a module to communicate with the terminal connected to the vehicle communication device 100 or an external device. The communication unit 110 may include a wired communication unit 111 and a wireless communication unit 112. The vehicle communication device 100 and the terminal may be connected to each other via a transmission line. The wired communication unit 111 may be a module to transmit and receive signals through the transmission line. The wired communication unit 111 may be connected to the terminal through various transmission lines, such as a carrier cable, a coaxial cable, and an optical fiber cable. The wireless communication unit 112 may include at least one module to enable wireless communication between the terminal and a wireless communication system or between the terminal and a network in which the terminal is located. For example, the wireless communication unit 112 may use WLAN, CDMA, LTE, etc. However, the present disclosure is not limited thereto.

The interface unit 120 may connect the terminal or an external device to the vehicle communication device 100. The interface unit 120 transmits or receives data to or from the terminal. For example, the interface unit 120 may include an earphone/headset port, a data port, and a memory unit card port. The power supply unit 130 may supply power to the respective components of the vehicle communication device 100 under control of a controller 150. The memory unit 140 may store a program, input/output data, etc. to process and control the vehicle communication device 100. The memory unit 140 may include a flash memory unit, a hard disk, a RAM, and a ROM. The controller 150 may control overall operation of the communication unit 110, the interface unit 120, the power supply unit 130, and the memory unit 140. In addition, the controller 150 may perform control and processing related to the vehicle communication device 100. The vehicle communication device 100 may be connected to a user input unit or output unit (including a display unit and an audio output unit) of the vehicle or the AVN system to perform input or output related to the vehicle communication device 100.

Hereinafter, an embodiment in which a terminal located in a vehicle or adjacent to the vehicle outside the vehicle accesses a network through the vehicle communication device 100 will be described with reference to FIG. 1.

Figure 2:
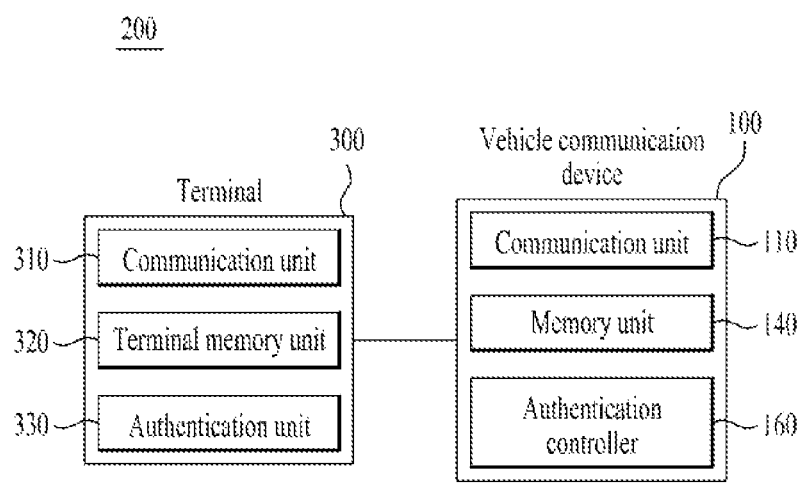
FIG. 2 is a view schematically showing construction of a terminal authentication system using the vehicle communication device according to an embodiment of the present disclosure.

FIG. 2 is a view schematically showing construction of a terminal authentication system 200 using the vehicle communication device 100 according to an embodiment of the present disclosure.

The terminal authentication system 200 includes the vehicle communication device 100 and a terminal 300 connected to the vehicle communication device 100. The vehicle communication device 100 and the terminal 300 may be connected to each other in a wired or wireless fashion. Specifically, interface units of the vehicle communication device 100 and the terminal 300 may be connected to each other, as an example, in a wired fashion through a universal series bus (USB) or a specific port. Also, the vehicle communication device 100 and the terminal 300 may be connected to each other, as an example, in a wireless fashion using near field communication (e.g. Bluetooth). However, the present disclosure is not limited thereto.

Referring to FIG. 2, the vehicle communication device 100 includes the communication unit 110, the memory unit 140, and an authentication controller 160. The communication unit 110 and the memory unit 140 were previously described with reference to FIG. 1 and, therefore, a repeated description thereof will be omitted.

The communication unit 110 may transmit/receive information regarding network authentication between the vehicle communication device 100 and the terminal 300. The memory unit 140 may store information or program necessary for network authentication, such as a network authentication application. In addition, the memory unit 140 may compile and store a list of terminals legally authenticated through an authentication procedure. Consequently, a terminal, once authenticated through a network authentication procedure, may access a network through the vehicle communication device 100 without any additional authentication procedure.

The authentication controller 160 controls an authentication procedure for the terminal connected to the vehicle communication device 100. The authentication controller 160 may be integrated into the controller 150. Specifically, the authentication controller 160 may control a certificate of network authentication corresponding to unique identification information of the terminal to be generated and a network authentication application stored in the memory unit 140 that can be called and transmitted to the terminal 300, such that authentication processing is performed by the terminal.

The terminal 300 may include a communication unit 310, a terminal memory unit 320, and an authentication unit 330. The communication unit 310 performs the same function as the communication unit 110 of the vehicle communication device 100, and thus a detailed description thereof will be omitted. The terminal memory unit 320 may store the certificate of network authentication and the network authentication application received from the vehicle communication device 100. The authentication unit 330 may perform authentication processing using the certificate of network authentication and the network authentication application stored in the terminal memory unit 320.

Figure 3:
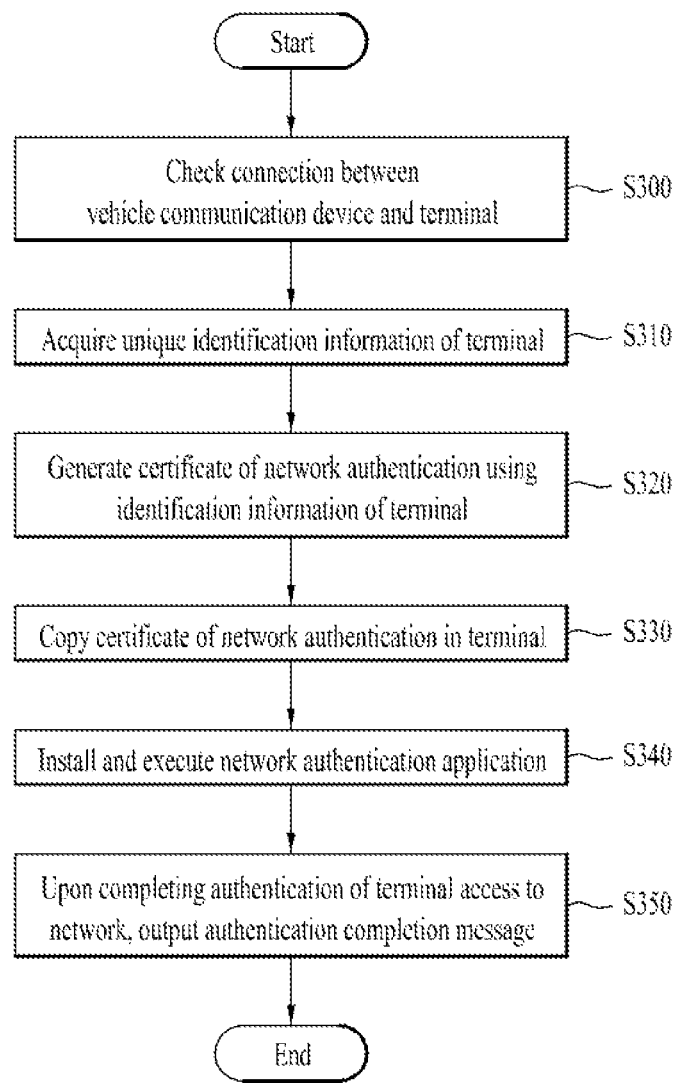
FIG. 3 is a flowchart showing a method of controlling, by the vehicle communication device, network authentication of a terminal according to an embodiment of the present disclosure.

FIG. 3 is a flowchart showing a method of controlling, by the vehicle communication device 100, network authentication of the terminal according to an embodiment of the present disclosure.

The authentication controller 160 of the vehicle communication device 100 may check connection between the vehicle communication device 100 and the terminal 300 to perform a network authentication procedure of the terminal 300 (S300). In the present disclosure, network authentication may mean a security procedure of identifying the terminal 300 to prevent an unauthorized user from using the vehicle communication device 100. As previously described, the vehicle communication device 100 and the terminal 300 may be connected to each other in a wired or wireless fashion. However, the network authentication procedure may be performed only through wired communication to prevent accessing the vehicle communication device 100 for network authentication based on near field wireless communication outside the vehicle through vehicle hacking. In a case in which network authentication is possible only through wired communication and the vehicle communication device 100 and the terminal 300 are not connected to each other in a wired fashion, therefore, the authentication controller 160 may control a message indicating that it is necessary to interconnect the vehicle communication device 100 and the terminal 300 in a wired fashion to be output through an output unit of the vehicle communication device 100 or an output unit of the terminal 300.

When the vehicle communication device 100 and the terminal 300 are connected to each other, the authentication controller 160 may acquire unique identification information of the terminal 300 (S310). The unique identification information is information to identify the terminal 300 connected to the vehicle communication device 100. The unique identification information may include hardware-related identification information. Specifically, the authentication controller 160 may check a media access control (MAC) address of the terminal 300 connected to the vehicle communication device 100 using Android Debug Bridge and acquire the unique identification information through the MAC address.

The authentication controller 160 may generate a certificate of network authentication using the unique identification information of the terminal 300 (S320). The certificate of network authentication is generated using the unique identification information of the terminal 300. When the certificate of network authentication is copied in another terminal, therefore, it is not possible to access the vehicle communication device 100 using the certificate of network authentication.

The authentication controller 160 may copy the generated certificate of network authentication in any area of the terminal 300 (S330). In this case, it is possible to copy the certificate of network authentication in the terminal using a push command of Android Debug Bridge. Subsequently, the authentication controller 160 may control a network authentication application for authentication of access to the network that can be automatically installed in the terminal 300 and executed (S340). The network authentication application is an application that performs a network authentication procedure using the certificate of network authentication. The network authentication application can be installed in the terminal 300 using Android Debug Bridge, or via any other suitable procedure. The network authentication application may be executed in a background state.

When the network authentication application installed in the terminal 300 completes authentication of access to the network using the certificate of network authentication copied in the terminal 300, the vehicle communication device 100 may transmit an authentication completion message and a message for disconnection between the vehicle communication device 100 and the terminal 300 that can be output through the output unit (S350).

Figure 4:
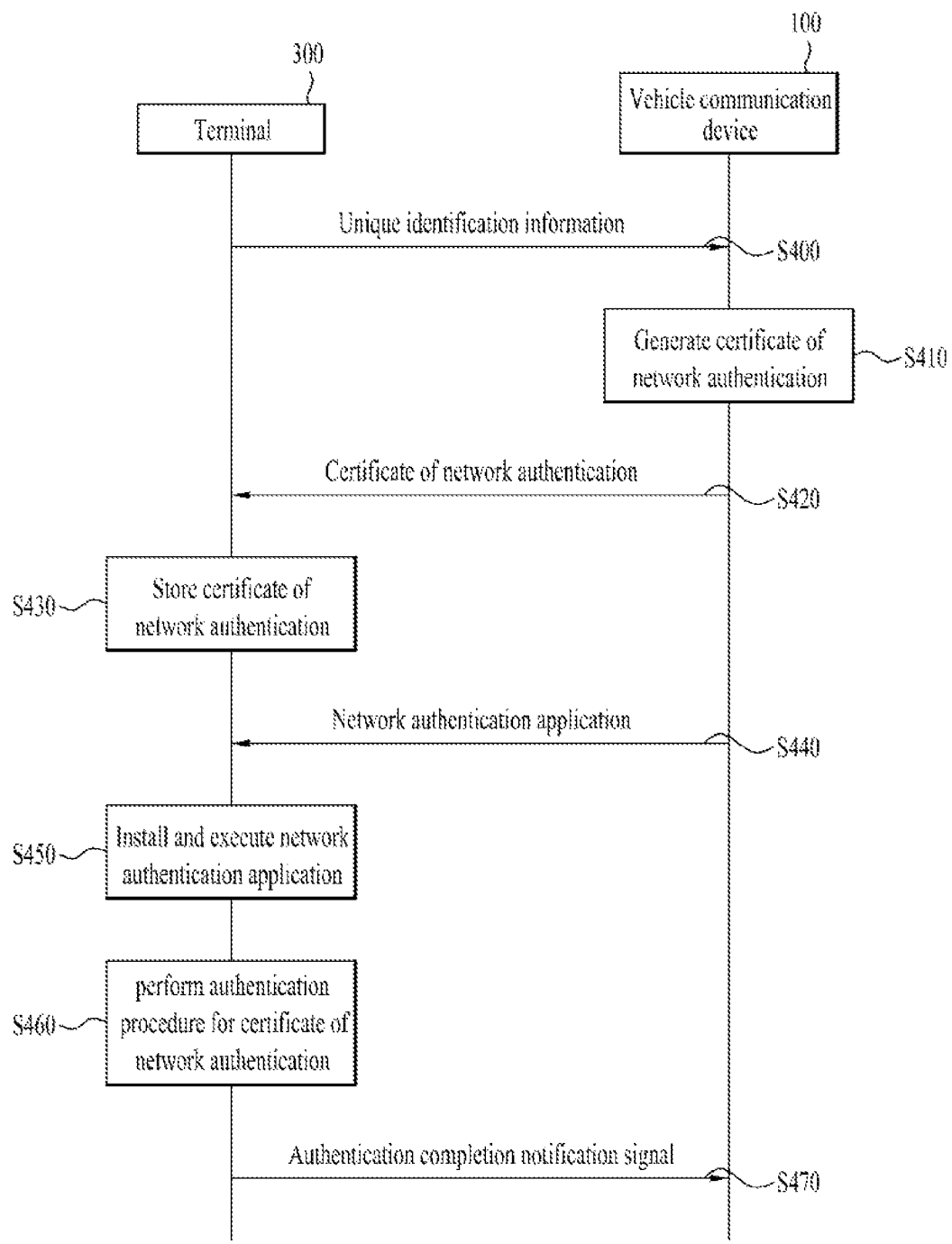
FIG. 4 is a flowchart showing a method of performing, by the terminal authentication system, network authentication

FIG. 4 is a flowchart showing a method of performing, by the terminal authentication system 200, network authentication of the terminal based on exchange of the certificate of network authentication according to an embodiment of the present disclosure.

The vehicle communication device 100 may acquire unique identification information of the terminal 300 connected to the vehicle communication device 100 from the terminal 300 (S400). To this end, as previously described, a shell utility (e.g. Android Debug Bridge) that checks device information of the terminal, copies a file, and installs an application may be used.

The vehicle communication device 100 may generate a certificate of network authentication using the unique identification information acquired at step S400 (S410). The certificate of network authentication may represent a unique certificate of network authentication corresponding to the unique identification information. The vehicle communication device 100 may copy and transmit the generated certificate of network authentication to the terminal 300 (S420). The transmitted certificate of network authentication may be stored in any area of the terminal 300 (S430).

Subsequently, the vehicle communication device 100 may transmit a network authentication application to the terminal 300 (S440) and control the network authentication application to be automatically installed in the terminal 300 and executed (S450). The terminal 300 may execute the network authentication application such that the certificate of network authentication stored in any area of the terminal 300 is called to perform authentication of access to the network (S460).

Upon completing the authentication of access to the network, the terminal 300 may transmit an authentication completion notification signal to the vehicle communication device 100 (S470). Upon completing the network authentication of the terminal 300, wired/wireless connection between the vehicle communication device 100 and the terminal 300 may be released. In addition, the network-authenticated terminal 300 may access the network through the vehicle communication device 100 in a wireless fashion.

As is apparent from the above description, according to at least one embodiment of the present disclosure, only the mobile terminal having passed the network authentication procedure described above can access the network through the vehicle communication device, thereby preventing unauthorized access to network and enhancing communication security.

It will be appreciated by persons skilled in the art that that the effects that can be achieved through the disclosed embodiments are not limited to what has been particularly described hereinabove, and other advantages of the embodiments will be more clearly understood from the above detailed description.

It will be apparent to those skilled in the art that various modifications and variations can be made in the disclosed embodiments without departing from the spirit or scope of the present disclosure. Thus, it is intended that the embodiments cover the modifications and variations of this disclosure provided they come within the scope of the appended claims and their equivalents.

What is claimed is:

1. A terminal authentication method for vehicle network connection in a vehicle, the terminal authentication method comprising:

acquiring, via wired communication, unique identification information of a terminal;

generating, by an authentication controller of the vehicle, a certificate of network authentication for wireless communication with the terminal using the unique identification information;

transmitting, by the authentication controller of the vehicle, the both of the generated certificate of network authentication for the wireless communication with the terminal and a network authentication application for network authentication of wireless communication to the terminal via the wired communication;

performing authentication of the terminal access to a network by causing the transmitted network authentication application to be executed in the terminal using the transmitted certificate of network authentication; and allowing the authenticated terminal the access to the network via the wireless communication.

2. The terminal authentication method according to claim 1, wherein the step of acquiring the unique identification information comprises:

checking a media access control (MAC) address of the terminal using Android Debug Bridge; and acquiring the unique identification information according to the MAC address.

3. The terminal authentication method according to claim 1, wherein the certificate of network authentication is copied in the terminal using a push command of Android Debug Bridge.

4. The terminal authentication method according to claim 1, wherein the network authentication application is controlled to be automatically installed in the terminal and executed by Android Debug Bridge.

5. The terminal authentication method according to claim 1, further comprising outputting an authentication completion message when the network authentication application completes authentication of the terminal access to the network using the copied certificate of network authentication.

6. A terminal authentication system for vehicle network connection in a vehicle, the terminal authentication system comprising:

a terminal; and a vehicle communication device including a) a communication unit to acquire, via wired communication, unique identification information of the terminal and b) an authentication controller of the vehicle to:i) generate a certificate of network authentication for wireless communication with the terminal using the unique identification information, ii) transmit both of the generated certificate of network authentication for the wireless communication with the terminal and a network authentication application for network authentication of wireless communication to the terminal via the wired communication, and iii) causing the transmitted network authentication application to be installed and executed in the terminal, wherein the terminal performs authentication of the terminal access to a network when the network authentication application is executed using the copied certificate of network authentication, and the authenticated terminal is allowed the access to the network via the wireless communication.

7. The terminal authentication system according to claim 6, wherein the unique identification information is acquired based on a MAC address of the terminal.

8. The terminal authentication system according to claim 6, wherein the certificate of network authentication is copied in the terminal using a push command of Android Debug Bridge.

9. The terminal authentication system according to claim 6, wherein the network authentication application is controlled to be automatically installed in the terminal and executed by Android Debug Bridge.

10. The terminal authentication system according to claim 6, further comprising an output unit to output an authentication completion message when the network authentication application completes authentication of the terminal access to the network using the copied certificate of network authentication.

11. A non-transitory computer readable medium containing program instructions for performing a terminal authentication method for vehicle network connection in a vehicle, the computer readable medium comprising:

program instructions that acquire, via wired communication, unique identification information of a terminal;

program instructions that generate, by an authentication controller of the vehicle, a certificate of network authentication for wireless communication with the terminal using the unique identification information;

program instructions that transmit, by the authentication controller of the vehicle, both of the generated certificate of network authentication for the wireless communication with the terminal and a network authentication application for network authentication of wireless communication to the terminal via the wired communication;

program instructions that perform authentication of the terminal access to a network by causing the network authentication application to be executed in the terminal using the transmitted certificate of network authentication; and program instructions that allow the authenticated terminal the access to the network via the wireless communication.

* * * * *